No. 686,274. Patented Nov. 12, 1901.
M. DUNN.
CALKING DEVICE.
(Application filed Mar. 20, 1901.)

(No Model.)

WITNESSES:
H. B. Bradshaw
A. L. Phelps

INVENTOR
Michael Dunn
BY
C. D. Shepherd
ATTORNEY

UNITED STATES PATENT OFFICE.

MICHAEL DUNN, OF DENNISON, OHIO.

CALKING DEVICE.

SPECIFICATION forming part of Letters Patent No. 686,274, dated November 12, 1901.

Application filed March 20, 1901. Serial No. 52,257. (No model.)

*To all whom it may concern:*

Be it known that I, MICHAEL DUNN, a citizen of the United States, residing at Dennison, in the county of Tuscarawas and State of Ohio, have invented a certain new and useful Improvement in Calking Devices, of which the following is a specification.

My invention relates to the improvement of calking-tools, and has particular relation to tool holding and operating attachments for calking-hammers.

The objects of my invention are to provide an improved calking device particularly adapted for calking the ends of boiler-tubes, to so construct said device as to insure the retention of the calking-tools at proper angles during the calking operation, to provide improved means for imparting the calking blows at different points simultaneously, to provide means for the ready adjustment of the tools to different positions, and to produce other improvements, which will be more fully pointed out hereinafter. These objects I accomplish in the manner illustrated in the accompanying drawings, in which—

Figure 1:
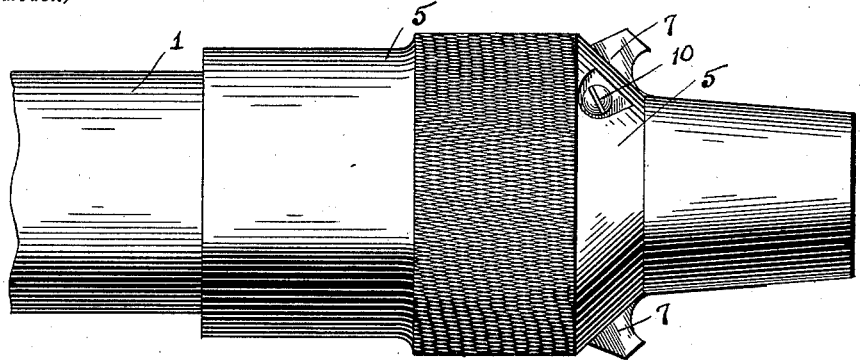
Figure 2:
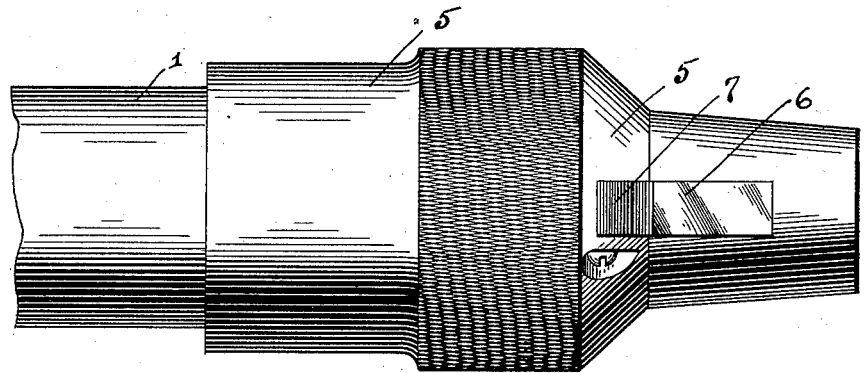
Figure 3:
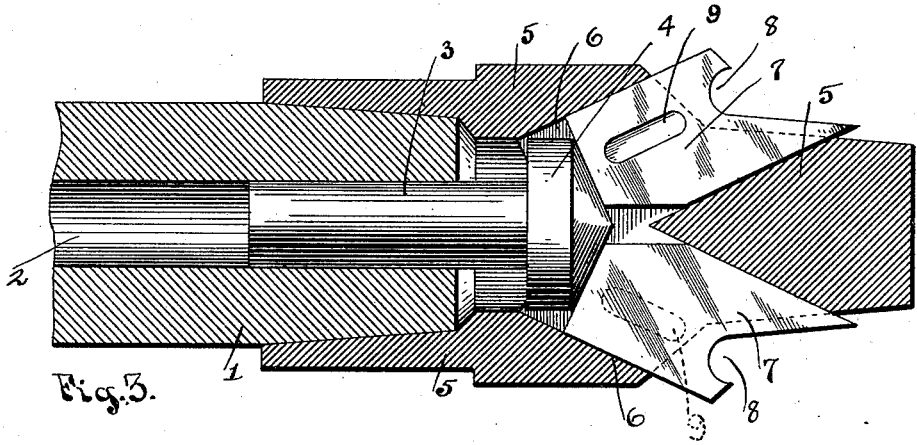
Figure 4:
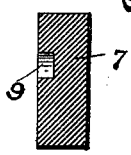

Figure 1 is a view in elevation of my improved device, showing the tools in their inner positions. Fig. 2 is a plan view of the same. Fig. 3 is a central longitudinal section through the hammer-head and my improved tool holding and operating mechanism, and Fig. 4 is a transverse section of one of the tool bodies or shanks.

Similar numerals refer to similar parts throughout the several views.

1 represents the hammer-head or hammer-body of a pneumatic calking-hammer, and 2 represents the central passage or bore thereof, within which is adapted to travel the usual hammer-operating piston, which is not herein shown. This central bore or opening 2 is in the present instance continued through the forward end of said hammer-body and in its forward portion receives the stem of a plunger 3, this plunger having formed, as indicated, on its outer end an enlarged head 4, the forward face of the latter being conical or provided with a double incline, as shown.

5 represents the tool-holding body, the rear sleeve-like portion of which loosely surrounds the forward end portion of the hammer-body 1, while the forwardly-extending and reduced portion of said tool-holder has leading therein the desired number of inwardly-inclined tool-receiving sockets 6, there being two of these sockets shown in the present instance. Into each of the sockets 6 is adapted to fit and slide the inner or shank portion of a calking-tool 7, the outer end of these tools being suitably recessed, as indicated at 8, to properly embrace and produce a calking contact with a boiler-flue end and the flue-sheet with which it connects. In order to prevent these tools from dropping from the holder through the pin-sockets 6, I preferably provide each of said tools in its shank portion with a longitudinal recess 9, which is adapted to receive the inner end of a suitable screw 10, which passes through the body of the holder. As indicated in Figs. 1 and 2 of the drawings, the periphery of the central and preferably larger portion of the holder 5 is preferably knurled or roughened to facilitate the turning of the same by hand, if desired.

In utilizing my improved calking device the tool-holder is held in proper position by the hands, and the usual hammer-operating piston, which reciprocates within the central bore 2 of the hammer-body 1, successively imparts blows upon the inner end of the stem of the plunger 3, resulting through the impact of the plunger-head and shanks of the tools 7 in the latter being driven against the joints of the flue-sheets and flues and desirable points and angles. In the present case, where but two of the tools are employed, it is obvious that the calking operation would be accomplished at two oppositely-located points simultaneously, although it is evident that any desired or convenient number of tools might be employed and operated upon by the plunger-head 4. Owing to the fact that the tool-holder 5 is loose upon the hammer-body 1, it will be readily seen that said tool-holder may be rotated to the desired degree to change the point of contact of the tools and flue ends.

From this construction it will be seen that a simple and convenient calking attachment is provided for pneumatic calking-hammers, which will facilitate the operation of calking boiler-flue ends and similar joints, insuring both accuracy and speed in the operation and permitting of ready adjustment.

Having now fully described my invention, what I claim, and desire to secure by Letters Patent, is—

In a calking device, the combination with a body 1 having a central bore therethrough and a plunger having its stem portion working in said central bore, said plunger having a head provided with a conical or inclined face, of a holder-body having its inner portion rotatably mounted on said body 1 and having its outer portion provided with inwardly-inclined sockets leading into said holder-body, a calking-tool movably supported within each of said sockets and means for imparting blows to the inner end of said plunger-stem, substantially as specified.

MICHAEL DUNN.

In presence of—
M. B. BREWSTER,
G. W. METCALF.